(12) United States Patent
Zhang et al.

(10) Patent No.: US 8,761,015 B2
(45) Date of Patent: Jun. 24, 2014

(54) METHOD AND SYSTEM FOR FRAME CLASSIFICATION

(75) Inventors: Zhi Gang Zhang, Beijing (CN); Chuanming Wang, Beijing (CN); Xiao Jun Ma, Beijing (CN); Huan Qiang Zhang, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 12/312,012

(22) PCT Filed: Oct. 25, 2006

(86) PCT No.: PCT/CN2006/002847
§ 371 (c)(1),
(2), (4) Date: Apr. 22, 2009

(87) PCT Pub. No.: WO2008/049270
PCT Pub. Date: May 2, 2008

(65) Prior Publication Data
US 2010/0067538 A1    Mar. 18, 2010

(51) Int. Cl.
*G01R 31/08* (2006.01)
(52) U.S. Cl.
USPC ........................................ 370/235; 370/235.1
(58) Field of Classification Search
None
See application file for complete search history.

(56) References Cited

U.S. PATENT DOCUMENTS

| | | | |
|---|---|---|---|
| 6,341,130 B1 * | 1/2002 | Lakshman et al. | 370/389 |
| 6,449,259 B1 * | 9/2002 | Allain et al. | 370/253 |
| 6,452,915 B1 * | 9/2002 | Jorgensen | 370/338 |
| 6,754,662 B1 * | 6/2004 | Li | 707/693 |
| 7,151,762 B1 * | 12/2006 | Ho et al. | 370/338 |
| 7,274,700 B2 * | 9/2007 | Jin et al. | 370/392 |
| 7,349,433 B2 * | 3/2008 | Ho | 370/469 |
| 7,450,504 B1 * | 11/2008 | Ho et al. | 370/230.1 |
| 7,552,275 B1 * | 6/2009 | Krishnan | 711/108 |
| 7,599,307 B2 * | 10/2009 | Seckin et al. | 370/252 |
| 7,630,351 B1 * | 12/2009 | Ho et al. | 370/338 |
| 7,639,657 B1 * | 12/2009 | Ho et al. | 370/338 |
| 2002/0089989 A1 | 7/2002 | Christensen et al. | |
| 2003/0214948 A1 * | 11/2003 | Jin et al. | 370/392 |

(Continued)

FOREIGN PATENT DOCUMENTS

| | | |
|---|---|---|
| EP | 1336915 A1 | 8/2003 |
| WO | WO 02/07388 | 1/2002 |
| WO | WO 0207388 A2 * | 1/2002 |
| WO | WO 2004/100464 | 11/2004 |

OTHER PUBLICATIONS

Search Report Dated Jul. 23, 2007.
Supplementary European Search Report dated Aug. 23, 2011.

*Primary Examiner* — Ayaz Sheikh
*Assistant Examiner* — Faiyazkhan Ghafoerkhan
(74) *Attorney, Agent, or Firm* — Tutunjian & Bitetto, P.C.

(57) ABSTRACT

The present invention provides a method and a device for classifying data frames. The method is typically carried out by a communication device in a wireless network with quality of service capability. It comprises the step of comparing data in a frame to data in a plurality of classifier entries, wherein the order of comparison of the classifier entries with a frame is a function of a quality of service priority level, and the step of classifying a frame for which a match is found as a function of a parameter associated with the matching classifier entry.

9 Claims, 6 Drawing Sheets

(56) References Cited

U.S. PATENT DOCUMENTS

| | | |
|---|---|---|
| 2004/0047353 A1* | 3/2004 | Umayabashi et al. ... 370/395.63 |
| 2004/0064582 A1* | 4/2004 | Raghunath et al. ........... 709/240 |
| 2004/0100950 A1* | 5/2004 | Basu et al. .................... 370/389 |
| 2006/0039372 A1* | 2/2006 | Sarkinen et al. .............. 370/389 |
| 2006/0050714 A1* | 3/2006 | Blasco Claret et al. .... 370/395.2 |
| 2006/0104230 A1* | 5/2006 | Gidwani ........................ 370/328 |
| 2009/0180430 A1* | 7/2009 | Fadell ........................... 370/329 |

* cited by examiner

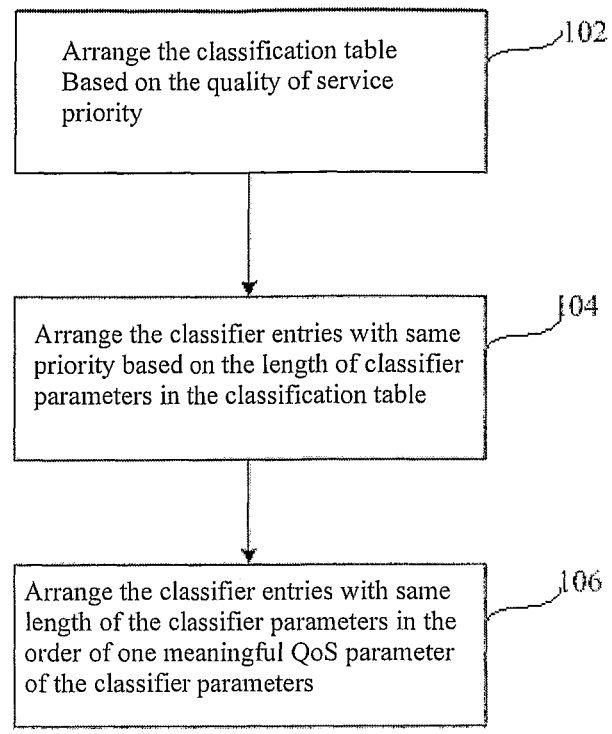
Fig.1
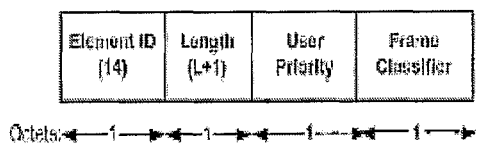
Fig.2
Prior Art
| Classifier Type | Classifier Parameters |
|---|---|
| 0 | Ethernet parameters |
| 1 | TCP/UDP IP parameters |
| 2 | IEEE 802.1D/Q Parameters |
| 3-255 | Reserved |
Fig.3
Prior Art

METHOD AND SYSTEM FOR FRAME CLASSIFICATION

This application claims the benefit, under 35 U.S.C. §365 of International Application PCT/CN2006/002847, filed Oct. 25, 2006, which was published in accordance with PCT Article 21(2) on May 2, 2008 in English.

FIELD OF THE INVENTION

The present invention generally relates to communication and networking technologies, in particular, to a method and a system for frame classification, which can classify a data frame rapidly for QoS-capable WLAN.

BACKGROUND OF THE INVENTION

In order to support quality of service (QoS) in a wireless network, e.g. a WLAN (Wireless Local Area Network), a frame classification module is proposed to be placed at a logical link control (LLC) sublayer of a wireless station. In an IEEE 802.11e WLAN environment for example, the station may be part of a basic service set (BSS). Frame classification looks for appropriate stream identifiers (stream IDs) to label frames passed down to the LLC sublayer by examining frames against classifiers in a classification table. The stream IDs are linked with a specific set of QoS parameter values for being used by a frame scheduling module to schedule the transfer of frames between LLC entities.

PCT International Publication No. WO 2002/07388 disclosed a method for arranging the classification table. The method is to sort each classifier entry in the order of descending 'search priorities' included in the classification entry. However, how to derive any meaningful search priority values is not specified.

SUMMARY OF THE INVENTION

The invention concerns a method for classifying data frames in a communication device for use in a quality of service capable network, comprising:
the step of comparing data in a frame to data in a plurality of classifier entries, wherein the order of comparison of the classifier entries with a frame is a function of a quality of service priority level, and
the step of classifying a frame for which a match is found as a function of a parameter associated with the matching classifier entry.

The classifier entries may be organized in a classification table. According to an embodiment of the invention, classifier entries with the same priority are ordered according to their length.

According to an embodiment of the invention, the comparison is carried out in the order of descending quality of service priority level. This helps speeding up processing for high priority frames.

According to an embodiment of the invention, the classifier entries may also be ordered as a function of the frequencies of occurrence of the different frames corresponding to a given quality of service priority level, the comparison being made in the order of diminishing frequency. This helps speeding up the overall comparison process until a match is found.

According to an embodiment of the invention, the device dynamically switches between the two types of comparison orders.

The invention also concerns a communication device comprising memory means for containing a frame classification program wherein said frame classification program is adapted to compare data in a data frame and a plurality of classifier entries to detect matches and to classify a frame as a function of a match wherein said program is adapted to order the classifier entries for the purpose of the comparison as a function of a quality of service priority level of each classifier entry.

When the classification table is arranged and the matched frame classification entry for an incoming frame is searched according to the method in the present invention, the data frames with higher QoS priority, which are QoS sensitive voice and video streams in general, will find the matched classifier entry faster than those with lower QoS priority. Meanwhile, based on the reasonable assumption that data frames with different type of classifier parameters are distributed with approximately equal likelihood for large amount of traffic, the method will acquire the best balance between finding the matched entry for the most QoS sensitive data frames rapidly and reducing the average looking up duration. Even if the incoming data frames are distributed in an extremely uneven manner, the proposed adaptive measurement-based classification table sorting method will reduce the average classification entry matching duration to the minimum value.

Other objects, advantages and novel features of the present invention will become more apparent from the following detailed description when taken in conjunction with the accompanying drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention together with the description which serves to explain the principle of the invention. In the drawings:

FIG. 1 is a diagram illustrating a flowchart of a method for arranging a classification table included in the frame classification module according to the present embodiment;

FIG. 2 is a diagram illustrating a structure of a TCLAS element, as known from the prior art;

FIG. 3 is a table illustrating the definition of frame classifier types, as known from the prior art;

DETAILED DESCRIPTION OF THE PREFERRED EMBODIMENT

Figure 4:
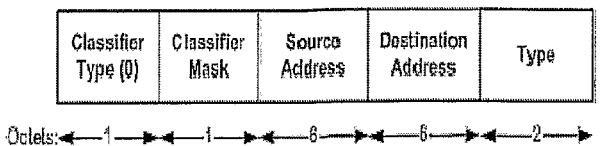
FIG. 4 is a diagram illustrating the definitions of frame classifier of Classifier Type 0 Field, as known from the prior art.

The technical features of the present invention will be described further with reference to a preferred embodiment. The embodiment is only given as an example and should not be used to limit the present invention. It will be well understood by the skilled person in the art upon reading the following detailed description in conjunction with the accompanying drawings.

While the embodiment is placed in the frame of an IEEE 802.11e network, the invention can be used in other environments. In particular, it may be applied to the data frame classification in any TCP/IP network.

FIG. 1 is a diagram illustrating a flowchart of a method for arranging a classification table included in the frame classification module according to the present embodiment. As shown in FIG. 1, in step 102, a plurality of classifier entries are arranged in the classification table based on at least one of parameters of the plurality of classifier entries. The parameters comprise a stream ID, a QoS priority, and at least one classifier parameter. The classifier parameters further comprise at least one of IP classifier parameters, at least one of LLC classifier parameters, and at least one of IEEE 802.1 D/Q parameters. IEEE 802.1 D and Q define virtual local area networks (VLANs).

Furthermore, when it is determined that there are any two of the plurality of classifier entries with same QoS priority in step 102, proceeding goes to step 104. In step 104, the classifier entries with smaller length of classifier parameters are arranged before those with greater length of classifier parameters in the classification table. The length of the classifier parameters is measured by the number of bits occupied by the classifier parameters.

Furthermore, when it is determined that there are any two of the plurality of classifier entries with same length of the classifier parameters, the proceeding goes to step 106. In step 106, the classifier entries with same length of the classifier parameters are arranged in the order of one meaningful QoS parameter of the classifier parameters.

In the IEEE 802.11e-2005 specification Part 11 (Wireless LAN Medium Access Control (MAC) and Physical Layer (PHY) specifications), Amendment 8 (Medium Access Control (MAC) Quality of Service Enhancements) published Nov. 11, 2005 and available from IEEE 3 Park Avenue New York, N.Y. 10016-5997, USA, a traffic classification (TCLAS) is defined to specify certain parameter values to identify the MSDUs (Medium Access Control Service Data Unit) belonging to a particular traffic stream (TS). The classification process, performed above the MAC SAP (medium access control service access point) at a QAP (an Access Point that is adapted to provide Quality of Service)), uses the parameter values for a given TS to examine each incoming MSDU and determines whether this MSDU belongs to that TS. The TCLAS element is provided in an ADDTS (add traffic stream) request and ADDTS response frames only for the downlink or bidirectional links. The ADDTS request is sent by the QSTA (a station that implements IEEE 802.11e QoS facility) to the QAP to ask for transmission permission for the traffic stream before starting transmission. The ADDTS response frame is transmitted, from QAP to QSTA, in response to an ADDTS request frame. The structure of this element is shown in FIG. 2.

As shown in FIG. 2, there are four fields in this element. The User Priority (UP) field contains the value of the UP of the associated MSDUs. The QoS facility supports eight UP values. The values a UP may take are the integers from 0 to 7 and generally a bigger number means a higher priority. An MSDU with a particular UP is said to belong to a traffic category (TC) with that UP value.

The Frame Classifier field comprises a Classifier Type, a Classifier Mask, and a set of Classifier Parameters. The Classifier Type is one octet in length and specifies the type of Classifier Parameters in this TCLAS. As shown in FIG. 3, there are three classifier types defined.

Figure 5:
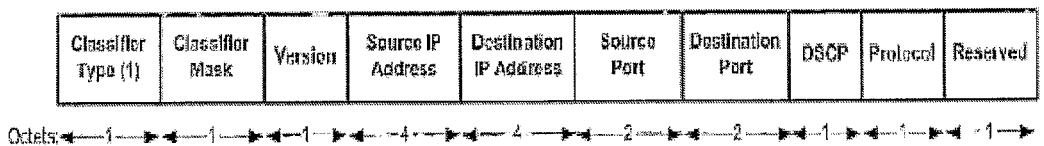
FIG. 5 is a diagram illustrating the definitions of frame classifier of Classifier Type 1 Field for traffic over IPv4, as known from the prior art.
Figure 6:
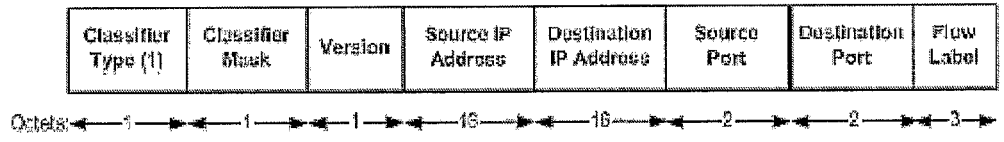
FIG. 6 is a diagram illustrating the definitions of frame classifier of Classifier Type 1 Field for traffic over IPv6, as known from the prior art.
Figure 7:
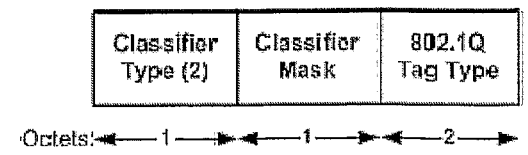
FIG. 7 is a diagram illustrating the definitions of frame classifier of Classifier Type 2 Field, as known from the prior art

For Classifier Type 0, 1, and 2, the definitions of frame classifiers are shown in FIGS. 4, 5, 6, and 7, respectively. As shown in FIG. 4, for Classifier Type 0, the Classifier Parameters have a length of 14 octets and includes Source Address, Destination Address and Type. As shown in FIG. 5, for Classifier Type 1, the Classifier Parameters for IPv4 have a length of 16 octets and includes Version, Source IP Address, Destination IP Address, Source Port, Destination Port, DSCP, Protocol, and Reserved, and as shown in FIG. 6, the Classifier Parameters for IPv6 have a length of 40 octets and includes Version, Source IP Address, Destination, Source Port, Destination Port, and flow label. As shown in FIG. 7, for Classifier Type 2, the Classifier Parameters have a length of 4 octets and includes Classifier Mask and 802.1Q Tag Type.

The IEEE 802.11e QoS facility runs mainly on a QAP with the cooperation of the QSTAs within a QoS capable WLAN. Furthermore, there is an HC (hybrid coordinator) in a QAP, which implements the frame exchange sequences, MSDU handling rules and bandwidth management functions defined in the IEEE 802.11e standard. Within the HC, a combination of TSID (traffic stream identifier—Any of the identifiers usable by higher-layer entities to distinguish MSDUs to MAC entities for parameterized quality of service within the MAC data service.), direction and non-Access Point QSTA address, defined as stream ID (stream identifier) in the present embodiment, identifies the traffic stream to which the traffic specification applies.

Accordingly, in accordance with the present embodiment, every entry in the classification table in 802.11e is a combination of QoS priority, stream ID and classifier parameters. Hereinafter, the method of arranging a classification table according to the present embodiment will be described in detail with reference to FIG. 8 and FIG. 9.

Figure 8:
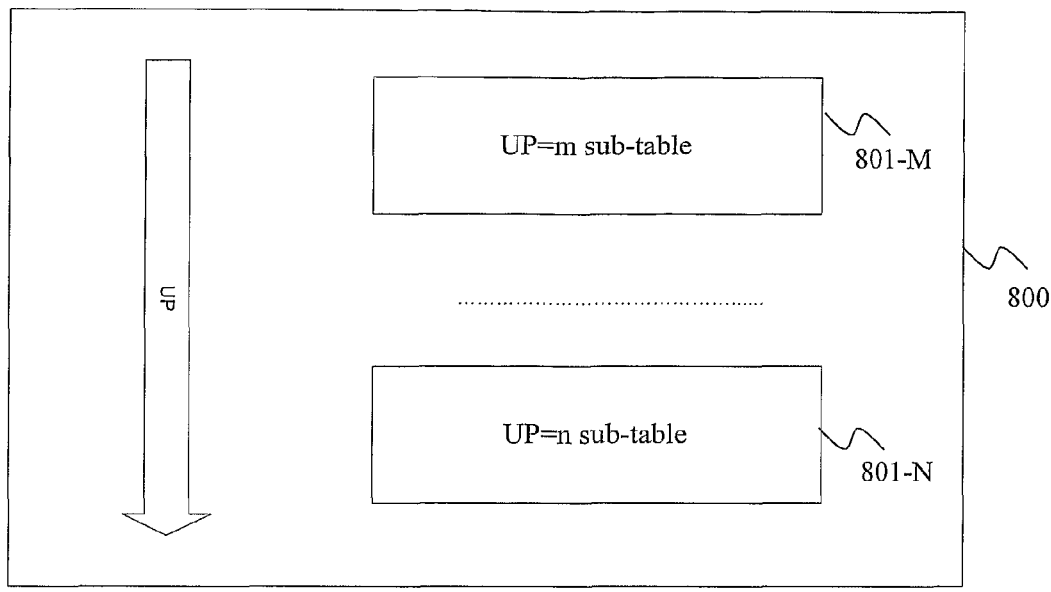
FIG. 8 is a diagram illustrating an example classification table according to the embodiment of the present invention.

FIG. 8 is a diagram illustrating an example classification table 800 according to the embodiment. Firstly, a plurality of classifier entries 801-*m* to 801-*n* with different user priority values are arranged in the classification table according to a predetermined criterion. In this embodiment, classifier entries with different UP values are placed in the classification table in the manner which is adaptively changed according to the defined criteria. For example, if the purpose is to ensure the data frames with higher QoS priority will always find the matched classifier entry faster than those with lower QoS priority, the classifier entries will be located in the order of descending UP values (in general, UP is an integer value from 7 to 0). If the aim is to reduce the average classification entry matching duration to the minimum possible level, the HC will monitor the incoming data frames' UP value distribution. Then based on this measurement, the classifier entries will be sorted dynamically in the way of the most frequently emerging UP value first, the least frequently emerging UP value in the last place.

In this embodiment, the classifier entries are sorted in the order of descending UP values. According to a variant of the present embodiment, the device switches between the two sorting possibilities above according to a parameter which may be a user input.

In a second step, it is determined whether there are any two classifier entries with the same UP values. When there are multiple classifier entries with the same UP value (for example, UP=n), these entries will be grouped within the same one sub-table.

Figure 9:
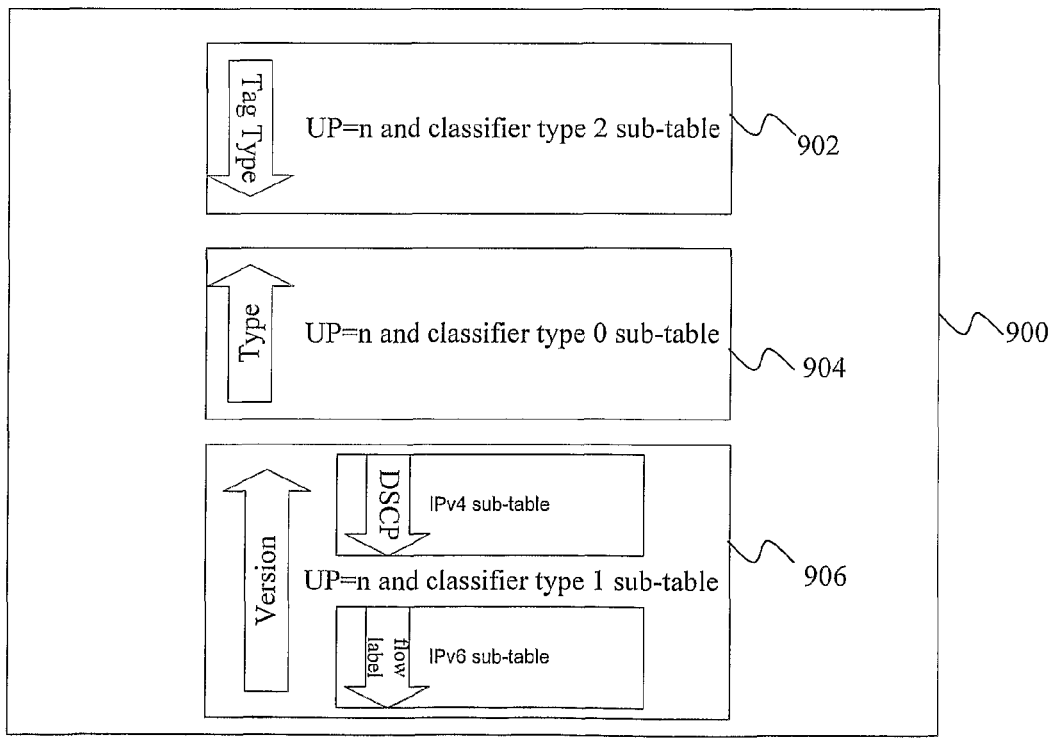
FIG. 9 is a diagram illustrating an example of user priority sub-table according to the embodiment of the present invention.

Then, as shown in FIG. 9, a given UP=n sub-table 900 is divided into as many sub-tables as there are classifier types: UP=n and classifier type 0 sub-table 904, UP=n and classifier type 1 sub-table 906, and UP=n and classifier type 2 sub-table 902. And these sub-tables will be arranged in the following order: UP=n and classifier type 2 sub-table 902 is the first one; UP=n and classifier type 0 sub-table 904 is the second one; UP=n and classifier type 1 sub-table 906 is the last one. I.e. classification is done according to increasing lengths of the classifier parameters.

Finally, for the entries in UP=n and classifier type 2 sub-table 902, they will be arranged in the descending order of 802.1Q Tag Type values in classifier parameters; for the entries in UP=n and classifier type 0 sub-table 904, they will be arranged in the ascending order of Type values in classifier parameters; for the entries in UP=n and classifier type 1 sub-table 906, they will be arranged in the ascending order of Version values in classifier parameters firstly. Furthermore, in UP=n and classifier type 1 sub-table 906, for IPv4 version number, the entries will be arranged in the descending order of DSCP (differentiated services code point) values; for IPv6 version number, the entries will be arranged in the descending order of flow label values. Therefore, an example UP sub-table in a classification table is shown in FIG. 9.

Figure 10:
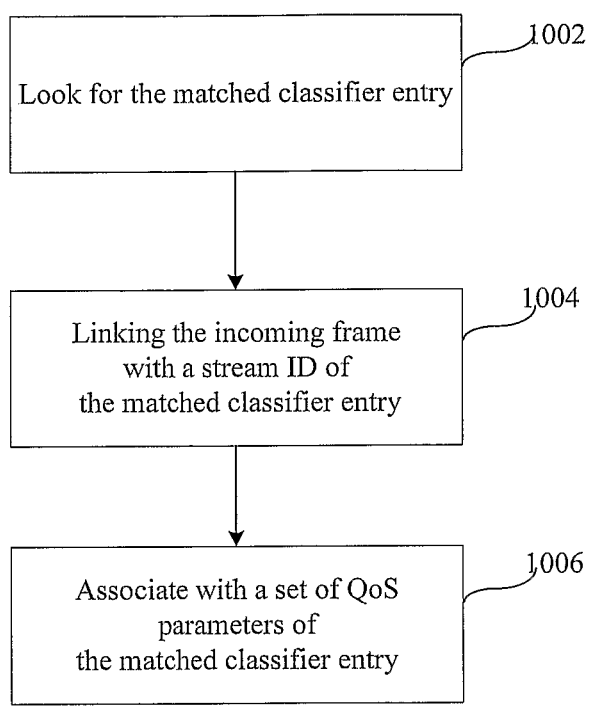
FIG. 10 is a flowchart of a frame classification method according to the embodiment of the present invention.

FIG. 10 is a flowchart of a frame classification method according to the present embodiment. The classification table is arranged as shown in FIG. 9. Hereinafter, the procedure of a frame classification method according to the embodiment will be described in detail with reference to FIG. 10 and FIG. 11.

As shown in FIG. 10, in step 1002, look for the matched classifier entry in a plurality of user priority sub-tables by examining the incoming frame against at least one classifier parameter in a classifier entry according to the order of the plurality of user priority sub-tables.

Figure 11:
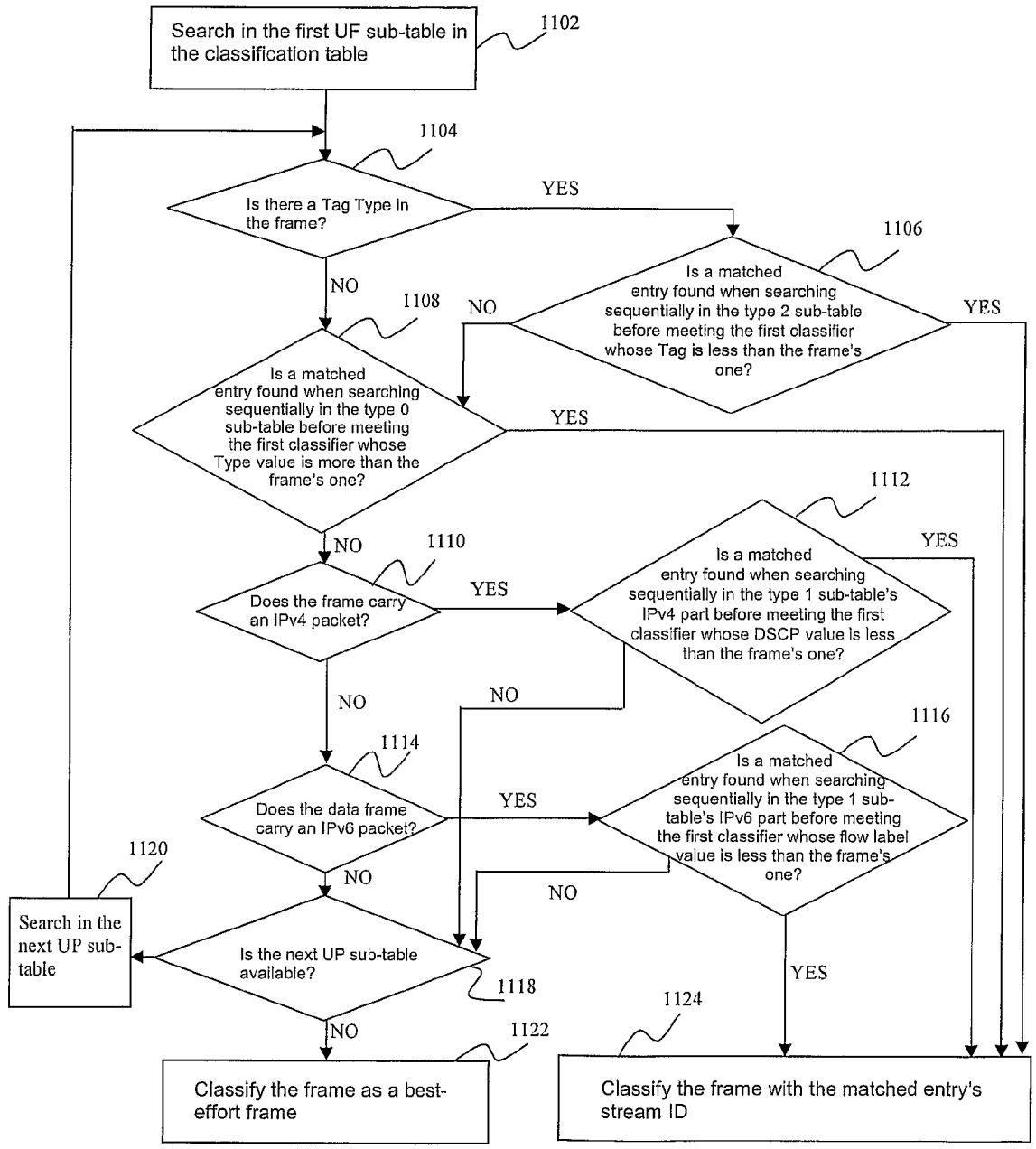
FIG. 11 is a flowchart of a frame classification method according to the embodiment of the present invention.

As shown in FIG. 11, in step 1102, search the UP sub-table in the classification table by examining the incoming frame against the classifier parameters in the entry. If a matched entry is found in this sub-table in step 1102, then in step 1104, determining if there is an IEEE 802.1Q Tag Type in the frame. If the determination of step 1104 is positive, processing goes to step 1106. In step 1106, searching the UP=n and classifier type 2 sub-table 802 which is arranged in the descending order of 802.1Q Tag Type values as shown in FIG. 9. In this sub-table, the frame classification will sequentially examine the classification entries, until it finds a matched one and goes to step 1124 to classify the frame with the matched entry's stream ID directly, or it meets the first frame classifier whose 802.1Q Tag Type value in classifier parameters is less than that of the frame and turns to step 1108.

If the determination of step 1104 is negative, processing goes to step 1108. In step 1108, in the UP=n and classifier type 0 sub-table, the frame classification will sequentially check the classifier entries, which are arranged in the ascending order of Type values in the Ethernet header as shown in FIG. 9, until it finds a matched one and goes to step 1124 to classify the frame with the matched entry's stream ID directly, or it meets the first frame classifier whose Type value in classifier parameters is more than that of the frame and turns to step 1110.

In step 1110, in the UP=n and classifier type 1 sub-table, the frame classification will check if the Type filed in the frame's Ethernet header is 0x0800, which indicates the payload in the Ethernet frame is IPv4 packet. If it is IPv4 packet, processing goes to step 1112, the frame classification will examine the classifier entries in IPv4 part of the sub-table. In the IPv4 part, the frame classification will sequentially examine the classification entries, which are arranged in descending order of DSCP values as shown in FIG. 9, until it finds a matched one and goes to step 1124 to classify the frame with the matched entry's stream ID directly, or it meets the first frame classifier whose DSCP value in classifier parameters is less than that of the frame and turns to step 1118 to determine if the next UP sub-table in the classification table is available. If there exists next UP sub-table, processing goes to step 1120 to begin searching the next UP sub-table as the steps mentioned above.

When it is determined the frame entry doesn't carry an IPv4 packet in step 1110, proceeding goes to step 1114 to determining whether the frame entry carry an IPv6 packet.

If the Type field is 0x86dd, which indicates the payload in the Ethernet frame is IPv6 packet, the frame classification will examine the classifier entries in IPv6 part of the sub-table. In the IPv6 part, the module will sequentially examine the classification entries, which are arranged in descending order of flow label values, until it finds a matched one and goes to step 1124 to classify the frame with the matched entry's stream ID directly, or it meets the first frame classifier whose flow label value in classifier parameters is less than that of the frame and turns to step 1118 to determine if the next UP sub-table in the classification table is available. If there exists next UP sub-table, processing goes to step 1120 to begin searching the next UP sub-table as the steps mentioned above.

If in step 1118, it is determined that there are not the next UP sub-table in the classification table available, proceeding goes to step 1122. In step 1122, the frame is classified as a best-effort frame.

As shown in FIG. 10, if a matched entry is found in the classification table, proceeding goes to step 1004. In step 1004, the incoming frame is linked with a stream identifier of the matched classifier entry and the matched classifier entry is passed down to the frame scheduling module.

Then in step 1006, the stream identifier is associated with a set of QoS parameters of the matched classifier entry and the incoming frame is transferred between LLC entities by the frame scheduling module.

Figure 12:
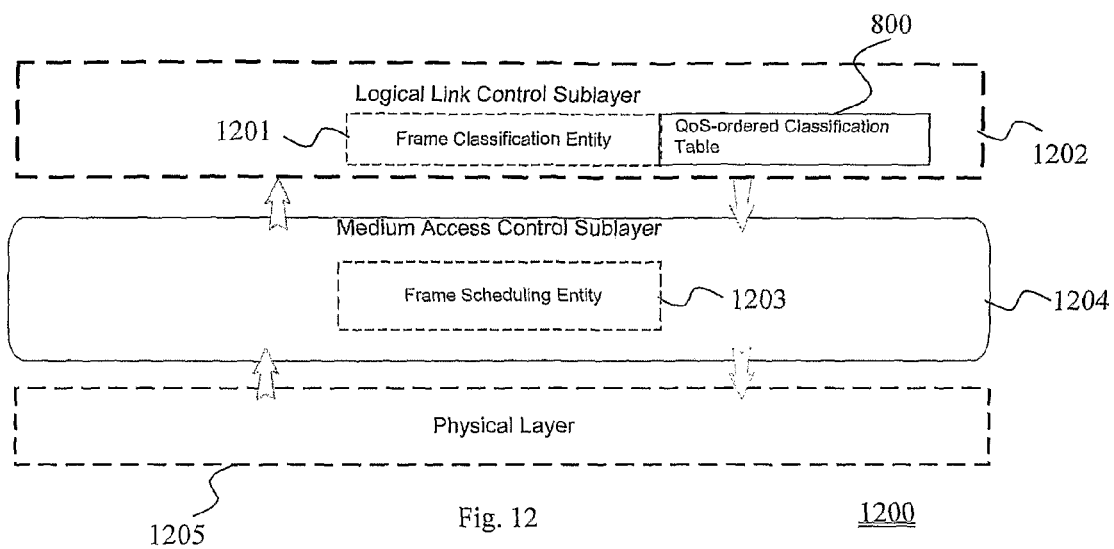
FIG. 12 is a diagram of an architecture reference model for an AP that supports the QoS facility according to the embodiment of the invention.

The architecture reference model for an Access Point that supports the invented Quality of Service facility is shown in FIG. 12. The Access Point 1200 includes a frame classification entity 1201 that implements the functionality of frame classification system mentioned above and is logically located in a logical link control sublayer 1202. The Access Point 1200 also includes a frame scheduling entity 1203 that will schedule the incoming frames according to the related Quality of Service parameters and is logically located at a medium access control sublayer 1204. The underlying physical layer 1205 is composed of a classical physical layer convergence protocol sublayer (not illustrated per se) and a classical physical medium dependent sublayer (not illustrated per se).

The Frame Classification Entity 1201 comprises the Quality of service ordered classification table 800 described earlier.

The processes of FIGS. 1, 10 and 11 are software programs run by a microprocessor of the Access Point. Logically speaking these software programs are part of the Frame Classification Entity 1201 of FIG. 12.

The invention claimed is:

1. A method for classifying data frames in a communication device for use in a quality of service capable network, comprising:
   determining a frequency of occurrence of frames corresponding to a given quality of service priority level;
   comparing data in a frame to data in a plurality of classifier entries, wherein the order of comparison of the classifier entries with a frame in an order of diminishing frequency of occurrence based on quality of service priority level; and
   classifying a frame for which a match is found as a function of a parameter associated with the matching classifier entry.

2. The method according to claim 1, wherein a classifier entry comprises a frame type field and at least one frame classifier parameter corresponding to the frame type of the classifier entry.

3. The method according to claim 2, wherein a frame type field indicates one among the following: Ethernet, Internet Protocol, virtual local area network.

4. The method according to claim 1, wherein, when it is determined that there are any two of the plurality of classifier entries with same quality of service priority level, the method further comprises the step of arranging, for the purpose of the comparison, the classifier entries according to increasing parameter length.

5. The method according to claim 4, wherein, when it is determined that there are any two of the plurality of classifier entries with same length, the method further comprises the step of arranging the classifier entries with same length in the order of at least one predetermined quality of service parameter.

6. Method according to claim 1, comprising the step of:
   linking an incoming frame with a stream identifier of a matched classifier entry and passing the matched classifier entry to a frame scheduling module after finding the matched classifier entry.

7. Communication device for use in a quality of service capable communication network, said device comprising
   a microprocessor;
   memory means for containing a frame classification program wherein said frame classification program is adapted to compare data in a data frame and a plurality of classifier entries to detect matches and to classify a frame as a function of a match;
   wherein said program is adapted to order the classifier entries for the purpose of the comparison as a function of a quality of service priority level of each classifier entry, the comparison being made in an order of diminishing frequency of occurrence of frames corresponding to a given quality of service priority level.

8. Communication device according to claim 7, wherein said memory comprises a table of classifier entries for use by the frame classification program, said classifier entries being ordered in the table as a function of descending quality of service priority level.

9. Communication device according to claim 8, wherein the order of classifier entries with the same quality of service priority level is a function of classifier parameter length.

* * * * *